Figure 1:
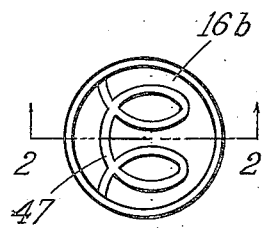

Feb. 19, 1952  J. P. McNAMARA  2,586,684
METHOD OF AND MEANS FOR MAKING A DECORATIVE OR DISTINCTIVE
MARKING ON CHOCOLATE, CARAMEL, ICING, AND
LIKE CONFECTIONERY SUBSTANCES

Filed Oct. 3, 1945  3 Sheets-Sheet 1

Inventor
J. P. McNamara
By Glascock Downing Seebold
Attys

Feb. 19, 1952   J. P. McNAMARA   2,586,684
METHOD OF AND MEANS FOR MAKING A DECORATIVE OR DISTINCTIVE
MARKING ON CHOCOLATE, CARAMEL, ICING, AND
LIKE CONFECTIONERY SUBSTANCES
Filed Oct. 3, 1945   3 Sheets-Sheet 2

Inventor
J. P. McNamara

Feb. 19, 1952     J. P. McNAMARA     2,586,684
METHOD OF AND MEANS FOR MAKING A DECORATIVE OR DISTINCTIVE
MARKING ON CHOCOLATE, CARAMEL, ICING, AND
LIKE CONFECTIONERY SUBSTANCES
Filed Oct. 3, 1945     3 Sheets-Sheet 3
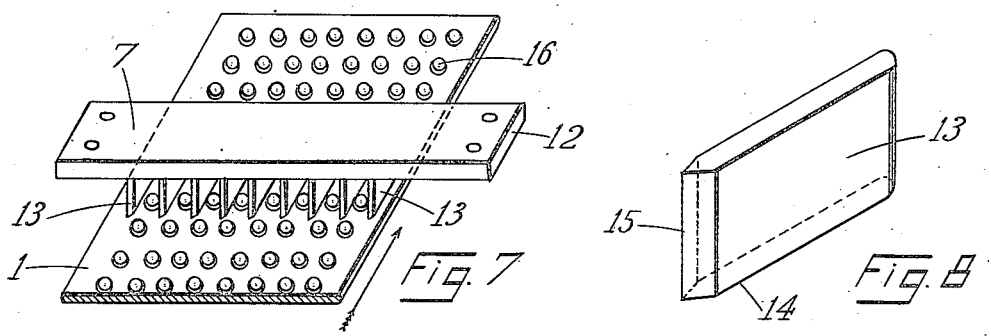
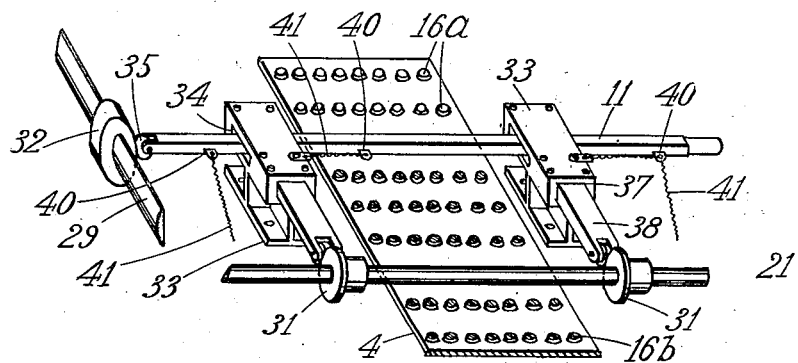
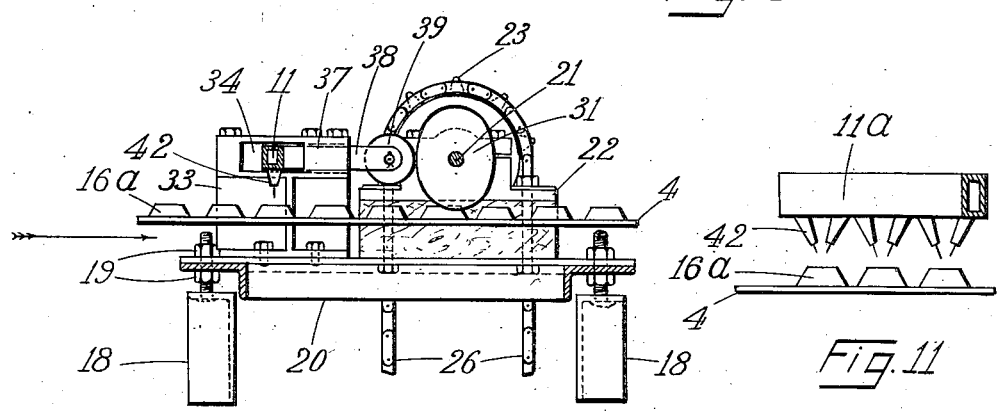
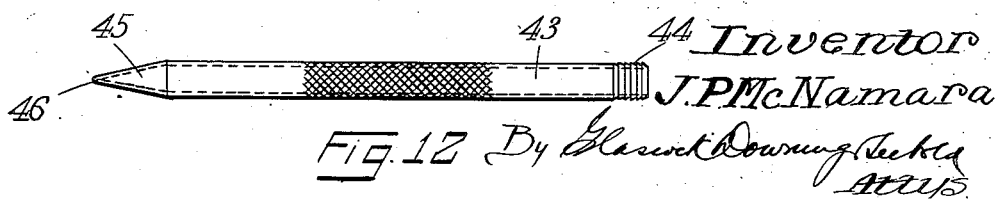

Patented Feb. 19, 1952

2,586,684

UNITED STATES PATENT OFFICE 2,586,684

METHOD OF AND MEANS FOR MAKING A DECORATIVE OR DISTINCTIVE MARKING ON CHOCOLATE, CARAMEL, ICING, AND LIKE CONFECTIONERY SUBSTANCES

John Percy McNamara, Dunedin, New Zealand, assignor of one-third to Romisons Confectionery Limited, Dunedin, New Zealand, a corporation of New Zealand Application October 3, 1945, Serial No. 620,063
In New Zealand July 7, 1944

Section 1, Public Law 690, August 8, 1946
Patent expires July 7, 1964

18 Claims. (Cl. 107—54)

This invention relates to an improved method of, and means for, making a decorative or distinctive marking on chocolate, caramel, icing, and like confectionery substances which pass through a plastic state prior to hardening.

In this specification, the term "plastic state" is used to mean that state in which the confectionery substance is capable of being indented, and with the method of hardening in use, such indentations will remain visible after hardening.

The invention is applicable whether the confectionery substance is itself formed into a confection or whether it is in the form of a coating wholly or partially covering another edible substance. For example, a common type of chocolate confection comprises an edible center consisting of either caramel, a cream preparation, an almond or other edible substance completely coated with chocolate; also the confection known as a chocolate biscuit may be a biscuit center completely covered or coated with chocolate, or may be a biscuit having only one side covered with chocolate.

It will be understood from the context that the invention is applicable to the above substances in such cases where the confectionery substance is in a suitable plastic state while presenting a surface which is accessible for carrying out the invention.

In the chocolate or the like coating of center, there is one process known in the art as "enrobing". In one form of apparatus used for enrobing, a travelling conveyor belt, hereinafter termed the "feeder" belt is provided upon which rows of centers are placed. From the feeder belt the centers are transferred onto a "coating" belt which generally comprises a travelling wire screen. Chocolate or the like coating substance is then deposited onto the centers. From the coating belt the coated centers are transferred onto a longer "delivery" belt at the beginning of which the top of the chocolate or the like coating substance is decoratively or distinctively marked either manually or mechanically. After marking, the coated centers are carried by the delivery belt into and through a freezing chamber in which the cooling effect is used to set the markings and to harden the chocolate or the like coatings. Finally, after emerging from the freezing chamber, the finished chocolate or the like confections are delivered to packing tables.

Previous manual methods of marking the surface of the chocolate or the like coatings, in the above process, are regarded as too slow and messy, while with both the manual and mechanical methods the projecting markings usually employed are liable to be easily damaged.

This invention aims to provide an improved method of, and means for, making a decorative or distinctive marking on chocolate, caramel, icing, and like confectionery substances which pass through a plastic state prior to hardening. The invention also in another aspect, aims to provide an improved enrobed product in which the decorative or distinctive marking is less liable to be damaged than is the case with the usual type of marked enrobed product.

The invention may be said to consist in a method of making a decorative or distinctive marking on chocolate, caramel, icing, and like confectionery substances which pass through a plastic state prior to hardening, consisting of directing such a jet of air onto the substance while such substance is in a plastic state as to form an indented marking, and subsequently setting or hardening the substance, thereby preserving the marking.

The invention may also be said to consist in means for making a decorative or distinctive marking on chocolate, caramel, icing, and like confectionery substances which pass through a plastic state prior to hardening, consisting of means for directing such a jet of air onto the substance while such substance is in a plastic state as to form an indented marking.

It will be obvious from the foregoing that the effect of the invention is to provide a marking which is indented into the product as opposed to the adherent markings commonly used in the art in marking enrobed products and it is contended that by the invention the markings, being of a non-projecting type, are not readily damaged.

Figure 2:
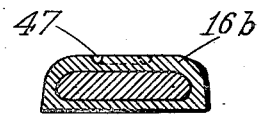
Figure 3:
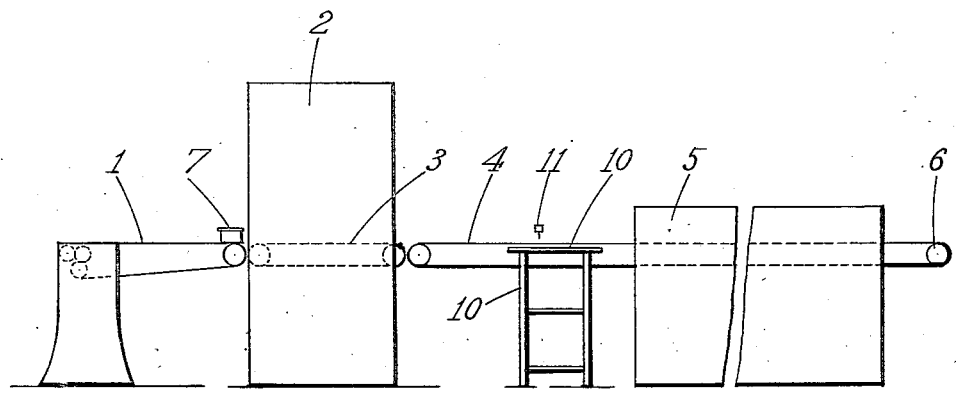
Figure 4:
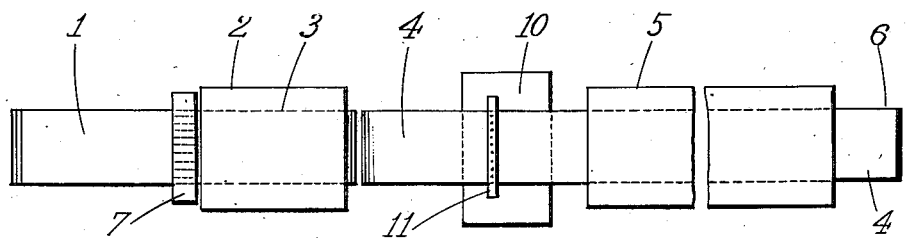
Figure 5:
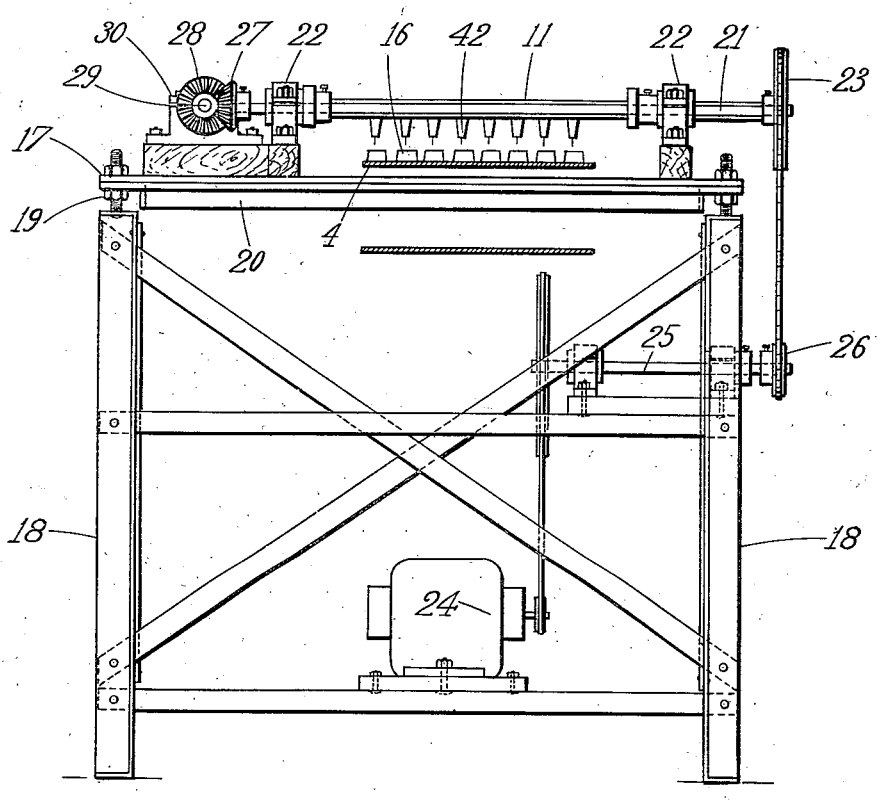
Figure 6:
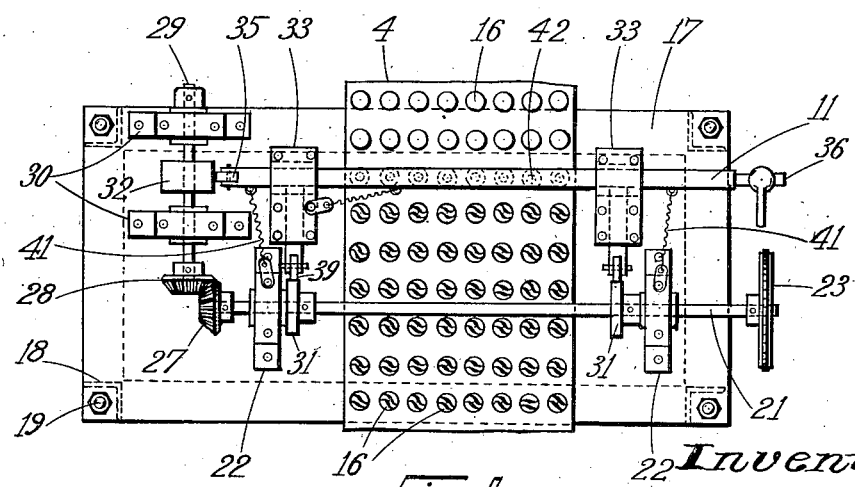

The invention will now, however, be described with reference to the accompanying drawings, in which Figure 1 is a plan of a finished chocolate or the like confection which has been marked according to the invention, Figure 2 is a vertical section therethrough, on the line 2—2 of Figure 1, Figure 3 is a diagrammatic side elevation on a reduced scale, showing an enrobing plant for use in the manufacture of some chocolate and the like confections, incorporating a preferred form of marking means according to the invention, Figure 4 is a diagrammatic plan corresponding with Figure 3, Figure 5 is a front elevation of the marking means on a larger scale than Figures 3 and 4, but under full size, the delivery conveyor belt being shown in section, Figure 6 is a plan corresponding with Figure 5, part of the delivery conveyor belt being shown, Figure 7 is a partial perspective view of the aligning means for mechanically aligning the centers or partially finished confections on the delivery conveyor belt, Figure 8 is a perspective view of an aligning plate detached from the aligning means and on a larger scale than Figure 7, Figure 9 is a partial perspective view of the actuating means for the air distributing tube, Figure 10 is a longitudinal vertical section through part of the marking means, on the line 10—10 of Figure 6, Figure 11 is a partial front elevation of an alternative form of air distributing tube having air nozzles arranged in pairs, and Figure 12 is a side elevation of alternative manually operable means for marking confectionery substances according to the invention.

The enrobing plant shown diagrammatically in Figures 3 and 4 of the drawings is adapted to coat a plurality of centers simultaneously. There are provided a series of three continuously operating conveyor belts. A "feeder" belt 1 is at the beginning or inlet of the system and the centers are placed thereon by hand, being spaced as desired.

Prior to enrobing, the centers on the feeder belt 1 are aligned or tracked into lines by being passed between a series of plates 13 forming part of aligning means 7 arranged over the feeder belt.

From the feeder belt 1 the centers pass onto a "coating" belt 3 which is in the form of a screen or mesh and which passes through an enrobing chamber 2. In the enrobing chamber the centers are coated or "enrobed" with chocolate or the like confectionery substance.

The "coating" belt 3 delivers the coated centers onto a "delivery" belt 4 whereon the coatings are decoratively or distinctively marked with clearly defined markings by marking means 10 to be hereinafter described.

Still on the "delivery" belt, the coated centers are then passed through a freezing tunnel 5 for setting or hardeing the coating and preserving the marking prior to discharge of the finished confections at 6.

In the case of confections which do not consist of coatings on centers, such as solid chocolates, said confections, while in a suitable plastic state, can be placed on the feeder belt and aligned, and passed through the enrobing chamber with the said chamber out of operation, then marked after the manner herein described, and subsequently hardened by cooling.

In the specification and claims herein the term "partially finished confections" is used and where used will be understood to mean either or both, according to the context, coated confections or confections without centers, when the coating substance in the first instance, of the substance constituting the confection in the second instance, is in a suitable plastic state for carrying out this invention.

Referring to Figures 7 and 8, the aligning means 7 comprises a top bar 12 disposed over the feeder belt and held in position by any suitable means such as brackets attached to the framework, and projecting downwards from the top bar 12 and suitably secured thereto, are aligning plates 13, in the form of strips, with their lower edges 14 spaced slightly above the feeder belt 1. The said aligning plates are arranged lengthwise in the direction of travel of the feeder belt, and their entering edges are sharpened as at 15 in Figure 8.

The space between any two adjacent aligning plates 13 is such as to permit the passage of a single track or row of centers or partially finished confections 16 with very little clearance.

By such means, all of the centers or partially finished confections are made to travel on the belts in aligned tracks or rows.

Interchangeable aligning plates can be provided to suit varying sizes of centers or partially finished confections.

The centers or partially finished confections are transferred from the "feeder" belt 1 to the "coating" belt 3 and after enrobing the partially finished and coated confections 16a are transferred on to the delivery conveyor belt 4 without appreciable loss of alignment. In this manner the partially finished coated confections can be brought directly under air jet orifices to be hereinafter described which are arranged directly over each track or row of centers.

Referring more particularly to Figures 5, 6, 9 and 10, the marking means, generally denoted at 10 for marking the partially finished confections comprises a table with a flat steel top 17 and legs 18 and with adjusting nuts 19 at the top of the legs to enable vertical adjustment of the table top relative to the delivery belt 4. The upper and lower runs of the delivery belt 4 are disposed above and below the table top respectively. An angle steel framework 20 is provided below the table top to make the construction more rigid.

The table top 17 is rectangular and is disposed with its longer sides extending transversely of the direction of travel of the delivery belt 4. The side nearer the enrobing chamber will be hereinafter termed the "entry" side and the side nearer the freezing tunnel will be termd the "delivery" side.

An air distributing tube 11 of square or rectangular cross-section is mounted in apertured guide blocks 33 secured to the table top, one on each side of the delivery belt, and is disposed transversely of the delivery belt at a suitable height thereabove. The air distributing tube 11 is carried in guide ways 34 in the form of elongated horizontal slots in the guide blocks 33 in such a manner that the tube 11 can be moved both across the delivery belt and to and fro in the direction of travel of the belt as required, but cannot be moved vertically, so that controlling the movement thereof produces predetermined markings.

Means are provided to actuate the air distributing tube in a direction across the belt, and also to actuate said air distributing tube in a direction lengthwise of the belt, as follows:

A transversely substantially horizontal cam shaft 21 is rotatably mounted in bearings 22 on the table top 17, one bearing being on each side of the delivery belt, in such a position that the said cam shaft crosses above the delivery belt and is disposed nearer the delivery side than the entry side of the table top.

One end of the transverse camshaft 21 projects beyond the end of the table top, a chain wheel 23 being secured thereto. A power unit consisting of an electric motor 24 drives a countershaft 25 by means of a belt drive and a chain drive 26 drives the chain wheel 23 on the camshaft 21 from the countershaft 25 and so drives the said camshaft 21.

On the end of the transverse camshaft 21 opposite to the chain wheel 23 is secured a bevel gear wheel 27 meshing with another bevel gear wheel 28 secured to a substantially horizontal camshaft 29 at right angles to the camshaft 21, extending longitudinally of the belt 4 and carried in bearings 30 mounted to the table top 17 at one side of the delivery belt.

A pair of actuating cams 31 are secured to the cam shaft 21 and an actuating cam 32 is secured to shaft 29 hereinbefore described. The cams 31 on the transverse camshaft 21 are arranged with each one close to a bearing 22. On the longitudinal camshaft 29 and between the bearings 30 is secured the other cam 32 which has a wider face than the faces of cams 31.

The air distributing tube 11 is closed at the end adjacent to the wide-faced cam 32 and is forked or otherwise shaped to rotatably mount a roller 35 which is positioned to make constant contact with the said cam. The guide blocks 33 are positioned on the table top so that the air distributing tube, when in the central position, that is, the position midway between the extremes of its movement longitudinally of the belt, is approximately in line with the center of the wide-faced cam 32.

The opposite end of the air distributing tube is threaded to connect to a flexible air supply pipe. In Figure 6 an air valve 36 is shown at the inlet end of the air distributing tube.

Slide holes 37, Figures 9 and 10, are formed in the guide blocks 33 at right angles to the guide ways 34. The outer end of these holes face the transverse cam shaft and the holes communicate with the guide ways at their inner ends.

A slide bar 38 is freely accommodated in each slide hole 37 the inner end of each slide bar bearing against the air distributing tube, within the guideway 34. The outer end of each slide bar 38 is forked to mount a roller 39. The slide bars and guide blocks are so positioned that the rollers 39 will bear against the faces of the cams 31.

Spaced lugs 40 on the air distributing tube provide means for the attachment of one end of tension springs 41 whose other ends are connected to convenient parts of the plant or apparatus such as the respective bearings 22 and the left guide block 33 as viewed in Figure 6. The purpose of the said springs 41 is to hold the roller 35 and air distributing tube 11 in constant operational contact with the cam 32 and slide bars 38 respectively.

Small nozzles 42 having fine air jet orifices are provided at the underside of the air distributing tube 11, with connecting air passages communicating with the interior of the air distributing tube. The number of jets is dependent on the number of partially finished confections to be marked simultaneously.

The nozzles are so spaced on the air distributing tube that each one is disposed over a line or row of the partially finished confections coming from the enrobing chamber. The height of each nozzle above the top surface of a partially finished confection to be marked is determined having regard to the size of the partially finished confection, the depth and nature of the pattern to be marked, and in the case of a coated center the thickness of the coating. In the latter case, it is preferable that the coating be of sufficient thickness to permit the indenting of the marking without piercing the coating.

In operation, the marking of the partially finished confections is achieved by the impinging of the air jets thereon while said partially finished confections are in a plastic state, the marking being in the form of an indentation of the desired shape.

The pattern of the marking depends on the movement of the belt carrying the partially finished confections and on the movement of the nozzles and air jets as a result of the mechanical actuation of the air distributing tube by the cams 31 and 32.

Cooling is effected before the chocolate or the like can flow to fill the indented marking, thereby preserving the marking.

Interchangeable cams can be shaped to achieve a range of patterns as desired.

In a simple alternative, having limited capabilities only the cam means shown for actuating the air distributing tube in a direction across the belt may be provided, the cam means for actuating the air distributing tube in a direction lengthwise of the belt being omitted.

A typical marking on a finished confection 16b is shown in Figures 1 and 2, the marking 47 being a continuous "coil" shape formed by imparting a simple circular movement to the air distributing tube 11 while the partially finished confection passes beneath. The part of the continuous pattern shown in the drawings can be used to represent a letter "C" for "caramel," indicating the nature of the center. Similarly, other continuous patterns can be devised according to requirements.

Figure 11 shows an alternative arrangement of the jets 42 for the production of a different and distinctive form of pattern. In this arrangement, the nozzles are utilised in pairs on the air distributing tube 11a, each pair of nozzles being arranged to that the two jets orifices converge on to one line of partially finished confections. The convergence of two air jets on to each partially finished confection, in addition to forming two parallel lines of indentation, tends to blow the intervening chocolate or the like into a mound between the jets, thereby giving a raised surface or ridge between two indented markings. This result is obtained for instance with a pair of nozzles arranged with the jet orifices one half an inch apart and one quarter of an inch above the surface of the partially finished confections and converging so that the center lines of the jet orifices if projected would form an angle of 60 degrees.

The number of jets impinging on to each partially finished confection and the angles of the jets relative to the surface being marked may be varied within limits which would be obvious to any person skilled in the art.

In one satisfactory application of the invention chocolate coated centers are passed beneath nozzles having a jet orifice of from .007 inch to .01 inch diameter with the end of the nozzle about ¼ inch above the chocolate coating and supplied with air at a pressure of about six pounds per square inch and at a temperature of about 80° F. Satisfactory results are obtained using nozzles in the form of petrol stove jet nipples. If the coating of chocolate is as soft as it would normally be on leaving an enrobing chamber operated by a person skilled in the art, that is, if the chocolate is of the correct viscosity to be deposited in the enrobing chamber, it will be at the right plasticity to be marked on reaching the marking means under normal conditions and where the passage from the enrobing chamber is of normal duration.

Where a coated confection with a coating other than chocolate is to be marked, it will be clear that an enrobing chamber suitable to the coating substance is required, and it may be necessary to make suitable adjustments and/or modifications to the setting or hardening method subsequent to the marking.

It will be understood that the size of the jet, the air pressure and temperature thereof and the height of the jet above the confectionery substance should be adjusted according to the nature of the substance being marked and its state of plasticity. Such adjustments will be obvious to any person skilled in the art.

Some confections, which are not entirely coated with chocolate or the like, for instance, chocolate biscuits coated on one side only may necessitate turning over so that they will present surfaces which will be accessible for carrying out the invention.

Some confections which do not require enrobing, to be in a suitable plastic state for marking when they reach the jets, may be in such a soft state prior to passing through the enrobing chamber as to be liable to adhere to the aligning plates if provision is not made to avoid this. It will be obvious to anyone skilled in the art that, in such cases, the confections may be contained within suitable containers or moulds while travelling along the conveyor belts.

In the modification of the invention shown in Figure 12 there is provided a tube 43 one end 44 of which is adapted to be attached to a flexible rubber hose for connection to a source of air supply the other end being formed into a nozzle 45, with an air jet orifice 46 of about .007 inch to about .01 inch diameter. The tube 43 may be about $\frac{5}{16}$ inch diameter and about 5 to 7 inches long. Although not shown in the drawings, an air control valve may be incorporated in this modification although the user may regulate and control the effect of the air jet by its approach to and withdrawal from the confectionery substance being marked.

The operation of this latter form of the invention will be clear to anyone skilled in the art. In use, the air jet can be moved above the surface of a confectionery substance to effect a desired marking and can conveniently be used to write or indent any suitable mark on the surface of the confectionery substance. This hand operated device can be used in place of, or to supplement, the marking means illustrated in Figures 5, 6, 9 and 10 of the drawings.

What I claim is:

1. A continuous method of making predetermined clearly defined markings on chocolate, caramel, icing, and like confectionery substances which pass through a plastic state prior to hardening including passing the substance to be marked while in a plastic state along a predetermined path, directing a jet of air across the path of movement of the substance and moving the jet of air in a predetermined path as the substance moves past the same to indent the surface of the substance to produce the clearly defined marking.

2. A continuous method of making predetermined clearly defined markings on chocolate, caramel, icing, and like confectionery substances which pass through a plastic state prior to hardening including passing the substance to be marked while in a plastic state along a predetermined path, directing a jet of air across the path of movement of the substance, moving the jet of air in a predetermined path as the substance moves past the same to indent the surface of the substance to produce the clearly defined marking, and passing the marked substance through a hardening zone to harden the substance to preserve the marking.

3. A continuous method of producing predetermined clearly defined markings on chocolate, caramel, icing, and like confectionery substances which pass through a plastic state prior to hardening comprising moving a plurality of confections along a predetermined path, continuously aligning the same into rows, passing the same through an enrobing zone and applying a coating of a confectionery substance thereto, continuing the movement of the rows along said predetermined path, directing from above a plurality of jets of air across said path of movement, said jets corresponding in number to the number of rows of confections, and simultaneously moving said jets in a predetermined path as the confections pass therebeneath to indent the surface of the confectionery substance on each confection to produce the clearly defined marking.

4. A continuous method of producing predetermined clearly defined markings on chocolate, caramel, icing, and like confectionery substances which pass through a plastic state prior to hardening comprising moving a plurality of confections along a predetermined path, continuously aligning the same into rows, passing the same through an enrobing zone and applying a coating of a confectionery substance thereto, continuing the movement of the rows along said predetermined path, directing from above a plurality of jets of air across said path of movement, said jets corresponding in number to the number of rows of confections, simultaneously moving said jets in a predetermined path as the confections pass therebeneath to indent the surface of the confectionery substance on each confection to produce the clearly defining marking, and passing the marked confections through a hardening zone to harden the confectionery substance to preserve the marking.

5. Means for making a decorative or distinctive marking on a confectionery substance while in a plastic state, comprising means for supporting said confectionery substance, means for directing jets of air against the surface of the substance to indent the same, said air directing means including a plurality of converging air jets which form indented markings with a ridge therebetween.

6. A method of making predetermined clearly defined markings on a confectionery substance while in a plastic state comprising directing a jet of air having a diameter from .007 to .01 inch against the surface of the substance to indent the same to produce the predetermined marking and passing the substance through a hardening zone to preserve the marking.

7. A method of making predetermined clearly defined markings on a confectionery substance while in a plastic state comprising directing a jet of air having a diameter from .007 to .01 inch, a pressure of approximately six pounds per square inch and a temperature of approximately 80° F. against the surface of the substance to indent the same to produce the predetermined marking and passing the substance through a hardening zone to preserve the marking.

8. Means for making predetermined clearly defined markings on a confectionery substance while in a plastic state comprising means for supporting confections including the substance to be marked, means for directing a jet of air having a diameter of .007 to .01 inch against the surface of said substance and means for producing relative movement of said supporting means and said air directing means to indent the substance in accordance with the predetermined configuration of the markings.

9. Apparatus for continuously applying predetermined markings to confections including at least a layer of a confectionery substance that passes through a plastic state prior to hardening comprising a horizontally disposed, endless conveyor, adapted to support a plurality of said confections in partly finished condition and while the confectionery substance is in a plastic state, an air distributing tube disposed transversely across and above said conveyor, a plurality of jet nozzles depending from said tube and directed toward said conveyor, guide blocks supporting said tube for sliding movement transversely of said conveyor, said guide blocks having slots therein extending lengthwise of the conveyor permitting movement of said tube in a direction lengthwise of the conveyor, means for moving said tube and thereby said jets as the confections on the conveyor move therebeneath including cam means engageable with said tube to move the same both in a direction longitudinally of the conveyor and transversely thereof so that the air issuing from the nozzles impinges against the confectionery substance on the confections to indent the same to produce a clearly defined marking thereon.

10. Apparatus as defined in and by claim 9 wherein said cam means includes cam shafts extending transversely and longitudinally of said conveyor, at least one cam on each shaft, and wherein roller means are provided on the end of said tube adjacent said longitudinally extending cam shaft to cooperate with the cam thereon, at least one of said guide blocks having slide apertures therein at right angles to said tube, a slide bar disposed in said slide aperture, a roller carried at the outer end of said slide bar and cooperable with the cam on said transversely disposed cam shaft, and resilient means normally urging said rollers into contact with said cams.

11. A method of making a decorative or distinctive marking on chocolate, caramel, icing, and like confectionery substances which pass through a plastic state prior to hardening, consisting in moving the substance in a predetermined path, directing a jet of air across the path of movement of and onto the surface of the substance while in a plastic state to indent said surface and thereby produce a marking of the selected form and passing the substance through a hardening zone to harden the substance to preserve the marking.

12. A method of making a decorative and distinctive marking on a confectionery substance as defined in and by claim 11 consisting further in marking uniformly and simultaneously by a plurality of air jets, a plurality of partially finished confections.

13. A method of making a decorative or distinctive marking on chocolate, caramel, icing, and like confectionery substances which pass through a plastic state prior to hardening comprising moving a plurality of partially finished confections, each including the substance to be marked, uniformly and simultaneously past a plurality of air jets directed across the path of movement of the confections and moving the air jets as the confections move past the same to effect the desired marking.

14. A method of making a decorative or distinctive marking on chocolate, caramel, icing, and like confectionery substances while the substance to be marked is in a plastic state comprising directing a plurality of converging air jets against the substance to form indented markings with a ridge therebetween.

15. Apparatus for making predetermined clearly defined markings on chocolate, caramel, icing, and like confectionery substances which pass through a plastic state prior to hardening comprising means for supporting confections including the substance to be marked, means for directing jets of air against the surface of the confectionery substance of the confections on the supporting means while said substance is in a plastic state to form indented markings, and means for producing relative movement of the two first mentioned means in accordance with the predetermined configuration of the markings.

16. Apparatus for making predetermined clearly defined markings on confections as defined in and by claim 15 in which the air directing means includes a distributing tube arranged across the supporting means and above the same, and said tube having a plurality of jet orifices directed downwardly toward the supporting means.

17. Apparatus for making predetermined clearly defined markings on confections as defined in and by claim 15 in which the supporting means comprises a belt and the movement producing means includes cam means for moving the air directing means in a direction across the belt.

18. Apparatus for making predetermined clearly defined markings on confections as defined in and by claim 15 in which the supporting means comprises a belt and the movement producing means includes cam means for moving the air directing means both in a direction across the belt and longitudinally thereof.

JOHN PERCY McNAMARA.

REFERENCES CITED

The following references are of record in the file of this patent:

UNITED STATES PATENTS

| Number | Name | Date |
|---|---|---|
| 788,379 | Rich | Apr. 25, 1905 |
| 859,125 | Short | July 2, 1907 |
| 990,175 | Walker | Apr. 18, 1911 |
| 1,223,687 | Fritz | Apr. 24, 1917 |
| 2,405,879 | Fredricksen | Aug. 13, 1946 |